(12) United States Patent
Adachi

(10) Patent No.: US 10,913,147 B2
(45) Date of Patent: Feb. 9, 2021

(54) HORIZONTAL ARTICULATED ROBOT AND REVERSE INSTALLATION METHOD THEREOF

(71) Applicant: FANUC CORPORATION, Yamanashi (JP)

(72) Inventor: Satoshi Adachi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 122 days.

(21) Appl. No.: 15/865,561

(22) Filed: Jan. 9, 2018

(65) Prior Publication Data

US 2018/0229378 A1    Aug. 16, 2018

(30) Foreign Application Priority Data

Feb. 16, 2017   (JP) .................................. 2017-026751

(51) Int. Cl.
*B25J 9/04*       (2006.01)
*B25J 9/00*       (2006.01)
(Continued)

(52) U.S. Cl.
CPC ............. *B25J 9/044* (2013.01); *B25J 9/0018* (2013.01); *B25J 18/007* (2013.01); *B25J 19/007* (2013.01); *B25J 19/0066* (2013.01)

(58) Field of Classification Search
CPC ..... B25J 9/00; B25J 9/0018; B25J 9/04; B25J 9/044; B25J 18/00; B25J 18/007;
(Continued)

(56) References Cited

U.S. PATENT DOCUMENTS

| | | | |
|---|---|---|---|
| 2004/0033768 A1* | 2/2004 | Diehl | B24B 41/005 451/339 |
| 2005/0166699 A1 | 8/2005 | Meyerhoff et al. | |

(Continued)

FOREIGN PATENT DOCUMENTS

| | | |
|---|---|---|
| CN | 102729247 A | 10/2012 |
| CN | 105269560 A | 1/2016 |

(Continued)

OTHER PUBLICATIONS

THK Co., Ltd., "Structure and Features of Precision Ball Screw/Spline" in product information catalog, A15-248 to A15-249, Retrieved from the Internet: URL: http://www.chinathk.com/upfile/15.pdf; 4 pgs.

(Continued)

*Primary Examiner* — Prasad V Gokhale
(74) *Attorney, Agent, or Firm* — Maier & Maier, PLLC

(57) ABSTRACT

A horizontal articulated robot including a base; one or more arms, attached to the base so as to be capable of rotating horizontally; a ball screw spline shaft that is disposed at an end of the one or more arms and that supports a workpiece at one end of the ball screw spline shaft; a ball screw nut through which the ball screw spline shaft passes and which is driven; and two ball spline nuts configured to support the ball screw spline shaft passing through the ball spline nuts, respectively, on both sides of the ball screw nut interposed therebetween in a longitudinal axis direction. At least one of the ball spline nuts drives the ball screw spline shaft about the longitudinal axis with respect to the arms.

3 Claims, 5 Drawing Sheets

(51) Int. Cl.
B25J 18/00 (2006.01)
B25J 19/00 (2006.01)
(58) Field of Classification Search
CPC ........ B25J 18/04; B25J 19/00; B25J 19/0066; B25J 19/007
See application file for complete search history.

(56) References Cited

U.S. PATENT DOCUMENTS

| | | |
|---|---|---|
| 2009/0007713 A1 | 1/2009 | Meyerhoff et al. |
| 2012/0090422 A1 | 4/2012 | Meyerhoff et al. |
| 2013/0145893 A1 | 6/2013 | Kumagai |
| 2013/0152722 A1 | 6/2013 | Kumagai et al. |
| 2013/0205931 A1 | 8/2013 | Meyerhoff et al. |
| 2014/0109712 A1* | 4/2014 | Ono ................ B25J 9/042 74/490.02 |
| 2014/0174240 A1* | 6/2014 | Peng ................ B25J 9/123 74/490.03 |
| 2014/0199149 A1 | 7/2014 | Meyerhoff et al. |
| 2015/0258692 A1 | 9/2015 | Meyerhoff et al. |
| 2015/0321344 A1 | 11/2015 | Hahakura et al. |
| 2015/0321361 A1* | 11/2015 | Hahakura ........ B25J 18/00 74/490.01 |
| 2016/0221182 A1 | 8/2016 | Hahakura et al. |
| 2017/0190058 A1 | 7/2017 | Meyerhoff et al. |
| 2017/0274537 A1* | 9/2017 | Kondo ............. G05B 19/124 |
| 2018/0161984 A1* | 6/2018 | Ishige ............. B25J 19/023 |
| 2018/0161991 A1* | 6/2018 | Hoshino ........... B25J 9/044 |
| 2020/0292037 A1* | 9/2020 | Xu ................. B25J 9/10 |

FOREIGN PATENT DOCUMENTS

| | | |
|---|---|---|
| CN | 106272365 A | 1/2017 |
| CN | 107972020 A | 5/2018 |
| EP | 1 552 911 A1 | 7/2005 |
| EP | 2942161 A2 | 11/2015 |
| JP | H06-262555 | 9/1994 |
| JP | 2005-193347 A1 | 7/2005 |
| JP | 2009-257458 | 11/2009 |
| JP | 2010-221342 A1 | 10/2010 |
| JP | 2012-232362 A | 11/2012 |
| JP | 2014-4638 A | 1/2014 |
| JP | 2015-080837 A1 | 4/2015 |
| JP | 2015-212002 A | 11/2015 |
| JP | 2016-140921 A | 8/2016 |
| WO | 2012/029173 A1 | 3/2012 |
| WO | 2012/029174 A1 | 3/2012 |

OTHER PUBLICATIONS

Office Action dated Jul. 17, 2018 in corresponding Japanese Application No. 2017-026751; 6 pages including English-language translation.

Office Action dated Jun. 5, 2019, in corresponding Chinese Application No. 201810143807.9; 12 pages.

Office Action dated Dec. 18, 2019 in corresponding German Application No. 10 2018 102 681.1; 7 pages including English-language translation.

* cited by examiner

HORIZONTAL ARTICULATED ROBOT AND REVERSE INSTALLATION METHOD THEREOF

CROSS-REFERENCE TO RELATED APPLICATIONS

This application is based on Japanese Patent Application No. 2017-26751, the contents of which are incorporated herein by reference.

TECHNICAL FIELD

The present invention relates to a horizontal articulated robot and a reverse installation method thereof.

BACKGROUND

A horizontal articulated robot including a base, a first arm having one end attached to the base so as to be capable of rotating horizontally about a first vertical axis, a second arm attached to the other end of the first arm so as to be capable of rotating horizontally about a second vertical axis, and a ball screw spline shaft attached to an end of the second arm so as to be capable of vertically moving along a third vertical axis and rotating about the third axis has heretofore been known (for example, see Japanese Publication No. 2014-4638).

The horizontal articulated robot discussed in JP 2014-4638 has a structure in which a ball screw nut that is rotated about the third axis to thereby cause the ball screw spline shaft to move in a direction along the third axis and a ball spline nut that is rotated about the third axis to thereby cause the ball screw spline shaft to rotate about the third axis are provided in parallel in the longitudinal direction of the ball screw spline shaft. Power is transmitted to the ball screw nut and the ball spline nut from motors through belts passing over pulleys that are fixed to the ball screw nut and the ball spline nut, respectively, and thus the ball screw nut and the ball spline nut are rotated about the third axis.

In the horizontal articulated robot having a structure as described above, a workpiece is attached to a lower end of the ball screw spline shaft and moved vertically along the third axis and rotated about the third axis.

In this case, when the first arm or the second arm is rotated horizontally, a bending moment acts on the ball screw spline shaft due to an inertia of the workpiece.

Since the ball screw nut is vulnerable to the bending moment acting on the ball screw spline shaft, the generated bending moment needs to be received by the ball spline nut. Accordingly, there is a need to dispose the ball spline nut at a position closer to the workpiece than the ball screw nut is, i.e., below the ball screw nut.

SUMMARY

An aspect of the present invention provides a horizontal articulated robot including: a base; one or more arms attached to the base so as to be capable of rotating horizontally; a ball screw spline shaft that is disposed so as to be capable of rotating about a longitudinal axis extending in a vertical direction at an end of the one or more arms and capable of linearly moving along the longitudinal axis and that supports a workpiece at one end of the ball screw spline shaft; a ball screw nut through which the ball screw spline shaft passes, the ball screw nut being driven in a direction along the longitudinal axis with respect to the one or more arms; and two ball spline nuts configured to support the ball screw spline shaft so as to be capable of rotating about the longitudinal axis, the ball screw spline shaft passing through the ball spline nuts, respectively, on both sides of the ball screw nut interposed therebetween in a longitudinal axis direction. The ball screw spline shaft passing through at least one of the ball spline nuts is driven about the longitudinal axis with respect to the one or more arms.

DETAILED DESCRIPTION

A horizontal articulated robot 1 according to an embodiment of the present invention will be described below with reference to the drawings.

Figure 1:
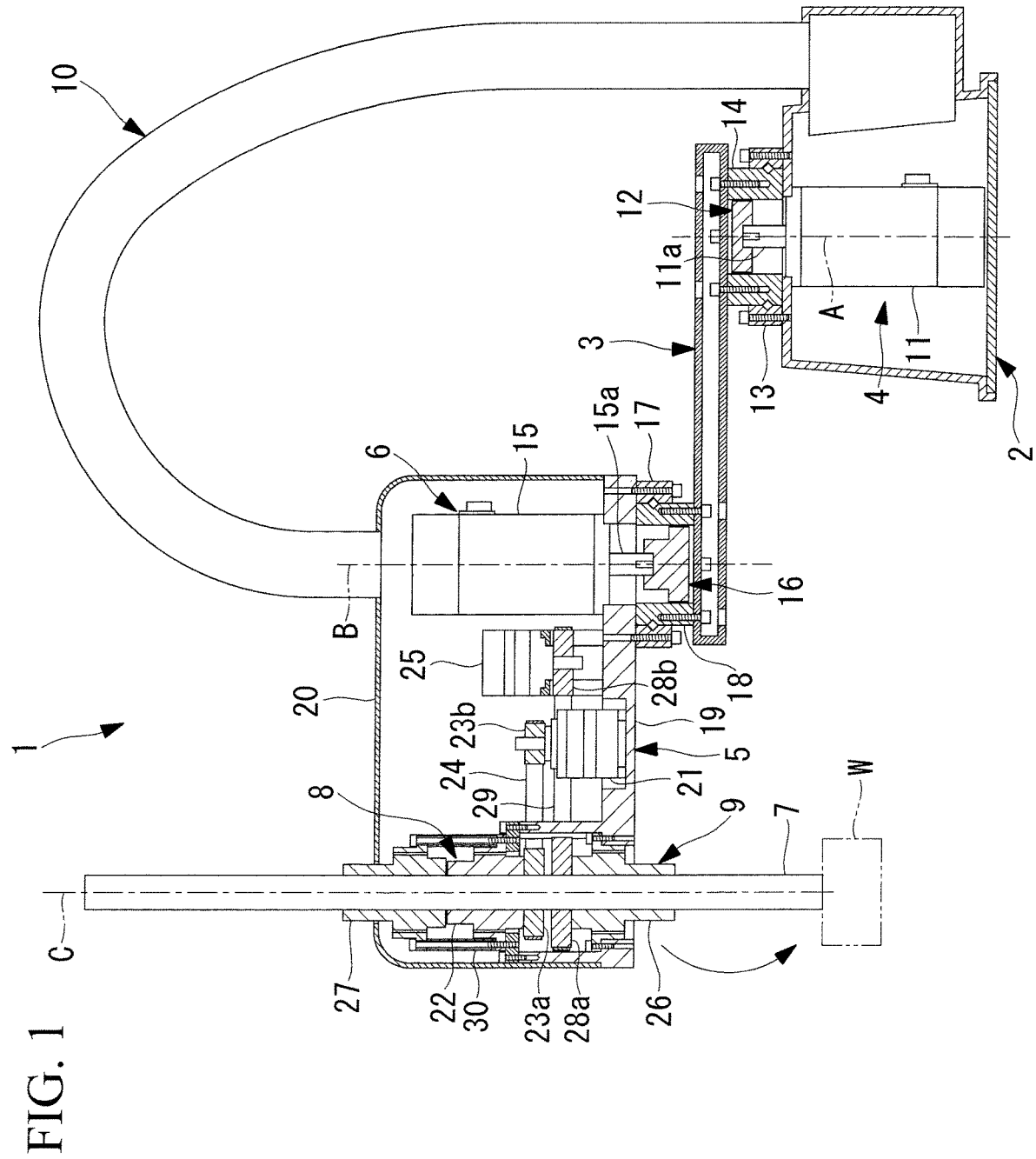
FIG. 1 a longitudinal sectional view illustrating a case where a horizontal articulated robot according to an embodiment of the present invention is used as a floor standing type horizontal articulated robot.

As illustrated in FIG. 1, the horizontal articulated robot 1 according to the present embodiment includes a base 2 that is installed on a floor surface or the like, a first arm (arm) 3 having one end attached to an upper part of the base 2 so as to be capable of rotating about a first vertical axis A, a first driving part 4 that causes the first arm 3 to rotate with respect to the base 2, a second arm (arm) 5 that is attached to the other end of the first arm 3 so as to be capable of rotating about a second vertical axis B, a second driving part 6 that causes the second arm 5 to rotate with respect to the first arm 3, a ball screw spline shaft 7 that is disposed at an end of the second arm 5 and is supported so as to be capable of moving vertically along a third vertical axis C and rotating about the third axis C, a vertical driving part 8 that causes the ball screw spline shaft 7 to move vertically, and a rotation driving part 9 that causes the ball screw spline shaft 7 to rotate. As illustrated in the drawings, a cable conduit 10 extends so as to couple the base 2 with the second arm 5 and, for example, guides a cable (not illustrated) for supplying power to a second motor 15, a third motor 21, and a fourth motor 25, which are described below, in the second arm 5.

The base 2 is formed in a hollow box shape and accommodates a first motor 11 constituting the first driving part 4.

The first driving part 4 includes the first motor 11 and a first reduction gear 12 which are arranged in series along the first axis A. The first motor 11 is disposed with an output shaft 11a oriented vertically upward, and the output shaft 11a is inserted into the first reduction gear 12 disposed upward. A gear that meshes with an input gear, which is not illustrated, in the first reduction gear 12 is attached to the output shaft 11a.

The first reduction gear 12 includes a mounting part 13 that is formed in a disc shape having a predetermined thickness and is fixed to an upper surface of the base 2, and an output shaft 14 that is supported so as to be capable of rotating about the first axis A with respect to the mounting part 13. The first reduction gear 12 decelerates the rotation of the first motor 11, and amplifies the torque of the first motor 11 according to an inverse of a reduction ratio to cause the output shaft 14 to rotate.

The second driving part 6 includes the second motor 15 and a second reduction gear 16 which are arranged in series along the second axis B. In the second motor 15, an output shaft 15a is disposed vertically downward and the output shaft 15a is inserted into the second reduction gear 16 that is disposed downward. A gear that meshes with an input gear, which is not illustrated, in the second reduction gear 16 is attached to the output shaft 15a.

The second reduction gear 16 includes a mounting part 17 that is formed in a disc shape having a predetermined thickness and is fixed to the second arm 5, and an output shaft 18 that is supported so as to be capable of rotating about the second axis B with respect to the mounting part 17. The second reduction gear 16 decelerates the rotation of the second motor 15 and amplifies the torque of the second motor 15 according to an inverse of a reduction ratio to cause the output shaft 18 to rotate.

The second arm 5 includes a base part 19 on which the second motor 15 and the mounting part 17 of the second reduction gear 16 are mounted, and a cover 20 that is attached to the base part 19 and accommodates the second motor 15 and the like in a space between the base part 19 and the cover 20.

Figure 2:
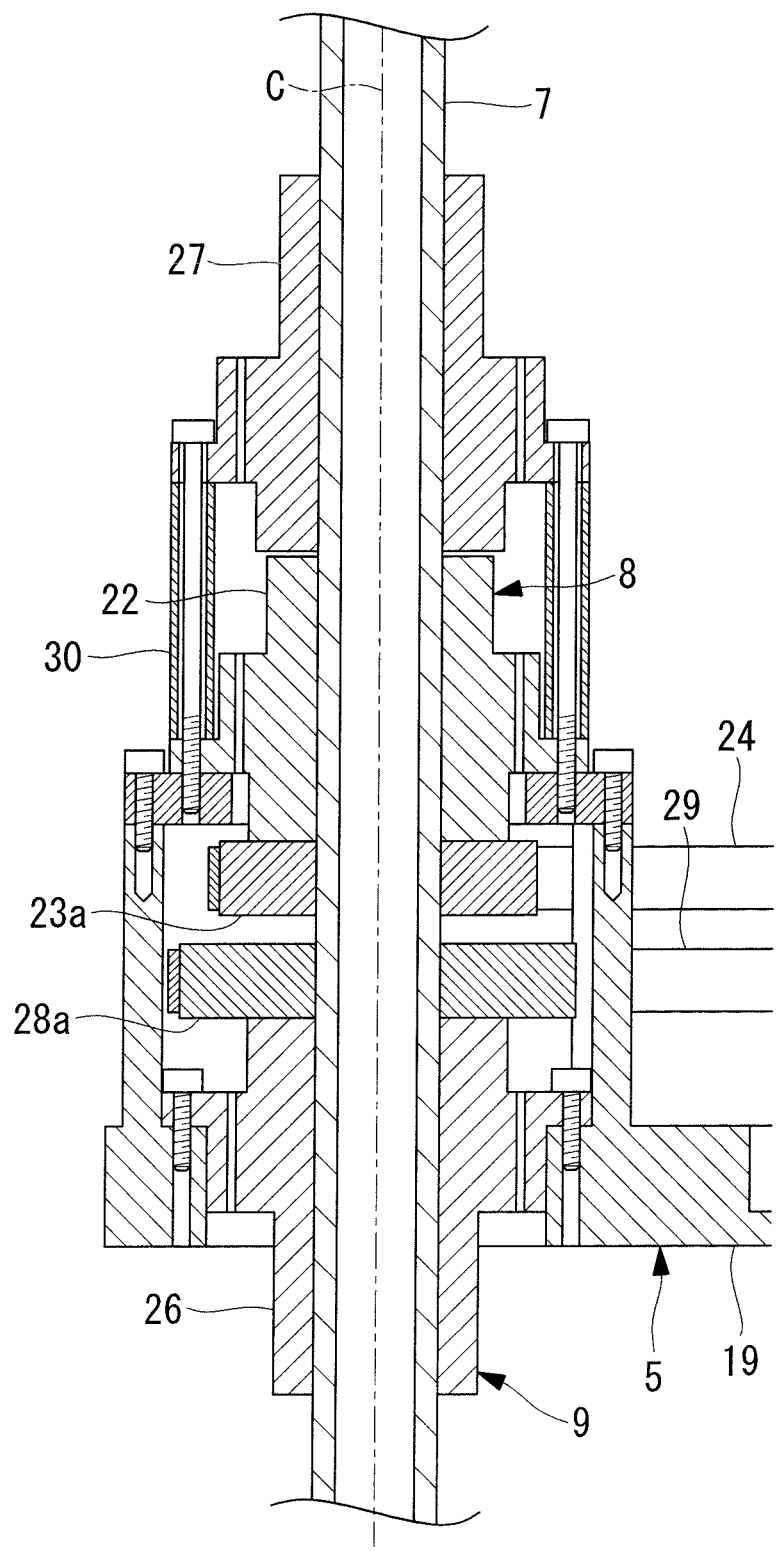
FIG. 2 is an enlarged longitudinal sectional view partially illustrating a vertical driving part and a rotation driving part of the horizontal articulated robot illustrated in FIG. 1.

As illustrated in FIGS. 1 and 2, the vertical driving part 8 includes the third motor 21 that is fixed to the base part 19, a ball screw nut 22 through which the ball screw spline shaft 7 passes and which is fixed to the base part 19, pulleys 23a and 23b that are fixed to the ball screw nut 22 and the third motor 21, and a belt 24 that passes over the pulleys 23a and 23b.

As illustrated in FIGS. 1 and 2, the rotation driving part 9 includes the fourth motor 25 that is fixed to the base part 19, two ball spline nuts 26 and 27 through which the ball screw spline shaft 7 passes and which are fixed to the base part 19 on both sides of the ball screw nut 22 interposed therebetween, pulleys 28a and 28b that are fixed to the ball spline nut 26, which is one of the two ball spline nuts, and the fourth motor 25, and a belt 29 that passes over the pulleys 28a and 28b. The ball spline nut 27, which is the other one of the two ball spline nuts, is not provided with a pulley and is not driven by the fourth motor 25.

The cable conduit 10 is a tube formed of a flexible material that is deformable by an external force. The cable conduit 10 rises vertically upward from the upper surface of the base 2 and is curved in an inverted J-shape, and a lower end of a linear part extending along the second axis B is fixed to an upper surface of the cover 20 of the second arm 5. The cable conduit 10 accommodates a cable for power supply and signal transmission to the second motor 15, the third motor 21, and the fourth motor 25 which are accommodated in the second arm 5.

An operation of the horizontal articulated robot 1 according to the present embodiment having a structure as described above will be described below.

As illustrated in FIG. 1, in the horizontal articulated robot that is operated as the floor standing type in which the bottom surface of the base 2 is fixed to a floor surface, when the first motor 11 of the first driving part 4 is operated, the rotation of the first motor 11 is decelerated by the first reduction gear 12 to amplify the torque, thereby causing the output shaft 14 to rotate about the first axis A with respect to the mounting part 13. The mounting part 13 is fixed to the upper surface of the base 2, and the output shaft 14 is fixed to the first arm 3. Accordingly, the first motor 11 drives the first arm 3 to rotate horizontally about the first axis A with respect to the base 2.

When the second motor 15 of the second driving part 6 is operated, the rotation of the second motor 15 is decelerated by the second reduction gear 16 to amplify the torque, thereby causing the output shaft 18 to rotate about the second axis B with respect to the mounting part 17. The mounting part 17 is fixed to the second arm 5, and the output shaft 18 is fixed to the first arm 3. Accordingly, the second motor 15 drives the second arm 5 to rotate horizontally about the second axis B with respect to the first arm 3. A combination of the rotation of the first arm 3 and the rotation of the second arm 5 enables two-dimensional change of the position in the horizontal direction of the ball screw spline shaft 7 that is held at an end of the second arm 5.

When the third motor 21 of the vertical driving part 8 is operated, the rotation of the third motor 21 is transmitted to the ball screw nut 22 by the pulleys 23a and 23b and the belt 24 to cause the ball screw nut 22 to rotate about the third axis C along the longitudinal axis of the ball screw spline shaft 7, thereby allowing the ball screw spline shaft 7 move vertically. As a result, the support part (not illustrated) that is provided at a lower end of the ball screw spline shaft 7 and supports the workpiece W is moved vertically.

When the fourth motor 25 of the rotation driving part 9 is operated, the rotation of the fourth motor 25 is transmitted to the ball spline nut 26, which is one of the two ball spline nuts, by the pulleys 28a and 28b and the belt 29, to cause the ball spline nut 26 to rotate about the third axis C, thereby allowing the ball screw spline shaft 7 to rotate about the third axis C. As a result, the workpiece W can be rotated about the third axis C.

Thus, according to the horizontal articulated robot 1 of the present embodiment, the position in the horizontal direction of the workpiece W that is supported by the support part at the lower end of the ball screw spline shaft 7 is two-dimensionally moved by the first arm 3 and the second arm 5 in a state where the workpiece W is maintained in a horizontal posture, and the height position of the workpiece W is adjusted by the vertical driving part 8 so that the rotational position in the horizontal direction of the workpiece W can be adjusted by the rotation driving part 9.

In this case, when the workpiece W is moved in the horizontal direction by the operation of the first arm 3 and the second arm 5, a bending movement acts on the ball screw spline shaft 7 due to the inertia of the workpiece W.

The bending moment is received by the ball spline nut 26 disposed at a position closest to the workpiece W, the bending moment can be prevented from acting on the ball screw nut 22 that is vulnerable to the bending moment.

Figure 3:
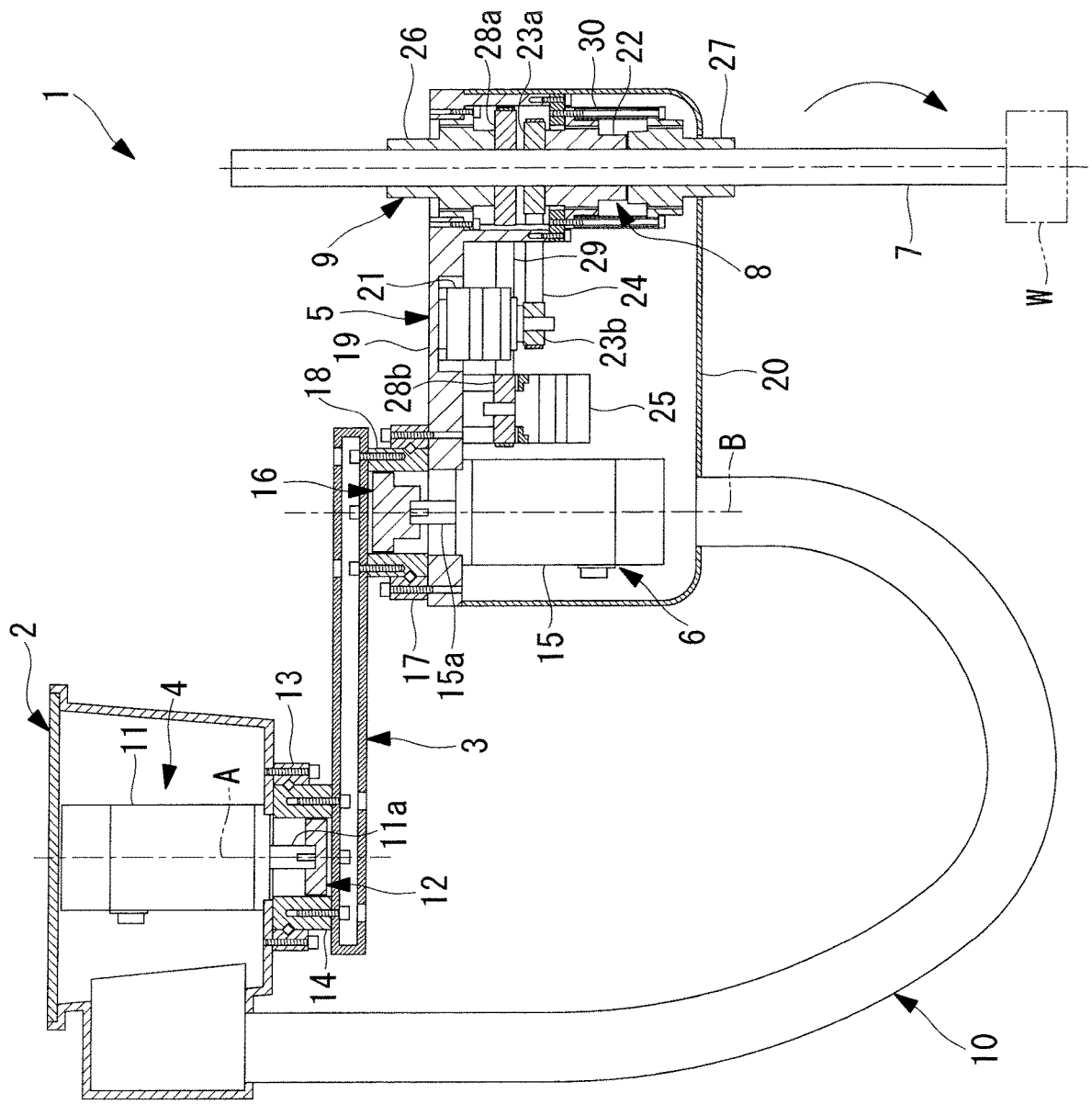
FIG. 3 is a longitudinal sectional view illustrating a case where the horizontal articulated robot illustrated in FIG. 1 is used as a ceiling suspended type.

According to the horizontal articulated robot 1 of the present embodiment, as illustrated in FIG. 3, when the horizontal articulated robot is operated as the ceiling suspended type in which the bottom surface of the base 2 is fixed to the ceiling, the ball screw spline shaft 7 is vertically reversed. Accordingly, the end of the ball screw spline shaft 7 at which the workpiece W is supported is replaced so that the workpiece W is supported at the lower end of the ball screw spline shaft 7. In this state, the workpiece W can be operated like in the floor standing type.

In this case, like in the floor standing type, the operation of the first arm 3 and the second arm 5 causes a bending moment to act on the ball screw spline shaft 7 due to the inertia of the workpiece W. According to the horizontal articulated robot 1 of the present embodiment, since the ball spline nuts 26 and 27 are disposed on both sides of the ball screw nut 22 interposed therebetween, one of the ball spline nuts 26 and 27 can be disposed near the workpiece W at the lower end of the ball screw spline shaft 7 when the horizontal articulated robot is installed as the floor standing type or the ceiling suspended type.

Thus, the horizontal articulated robot 1 according to the present embodiment has an advantage that in both the floor standing type and the ceiling suspended type, the bending moment can be prevented from acting on the ball screw nut 22 that is vulnerable to the bending moment. Specifically, the horizontal articulated robot 1 according to the present embodiment has an advantage that the horizontal articulated robot 1 can be used as it is without changing the axis configuration even when the horizontal articulated robot 1 that is used as the floor standing type is changed to the ceiling suspended type, or vice versa, due to a change in use environment at the site, or a layout change.

While the present embodiment illustrates the horizontal articulated robot 1 in which the pair of ball spline nuts 26 and 27 is preliminarily disposed on both sides of the ball screw nut 22 interposed therebetween, the present invention is not limited to this.

Figure 4:
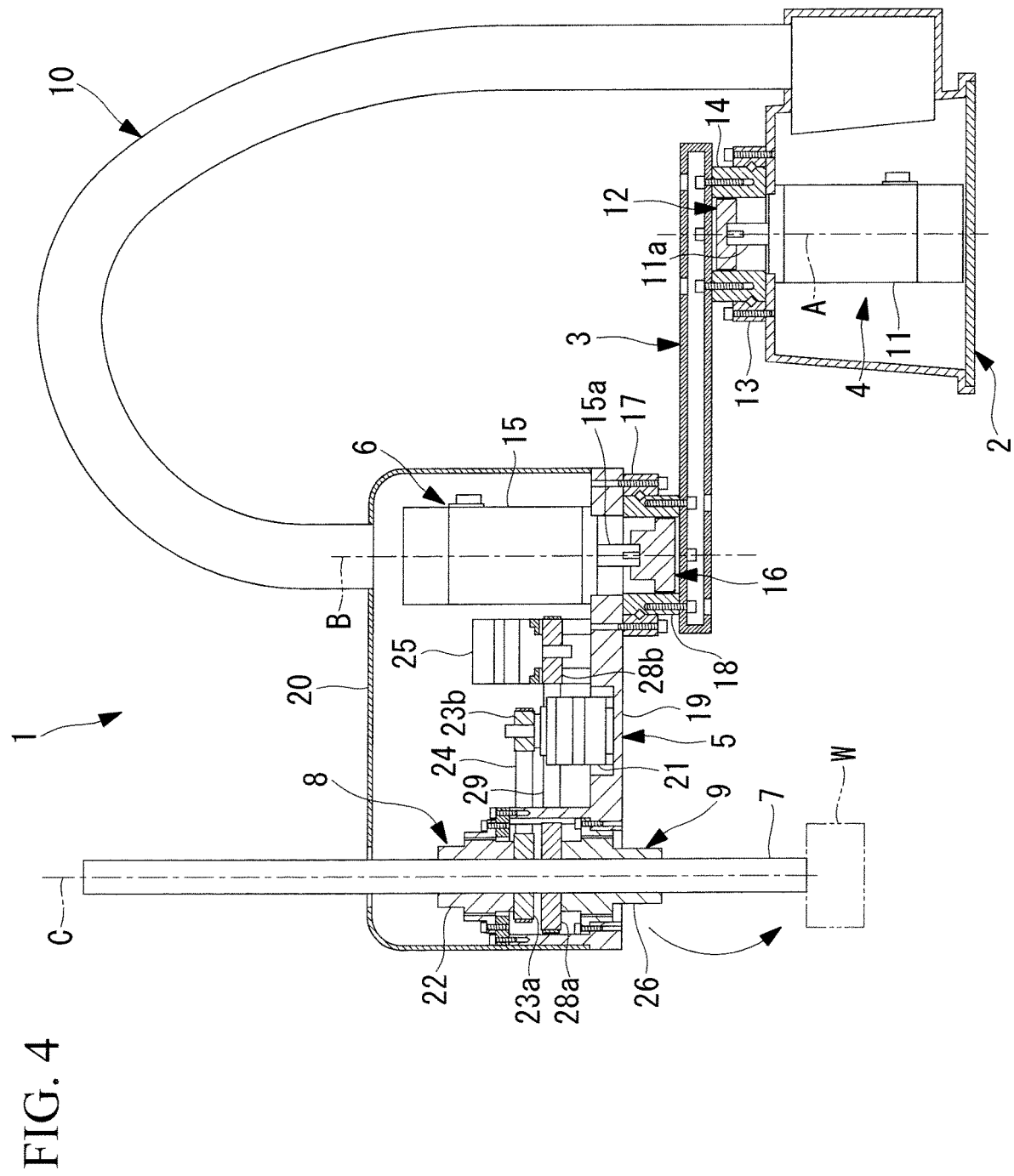
FIG. 4 is a longitudinal sectional view illustrating a floor standing type horizontal articulated robot before a reverse installation method according to an embodiment of the present invention is applied.
Figure 5:
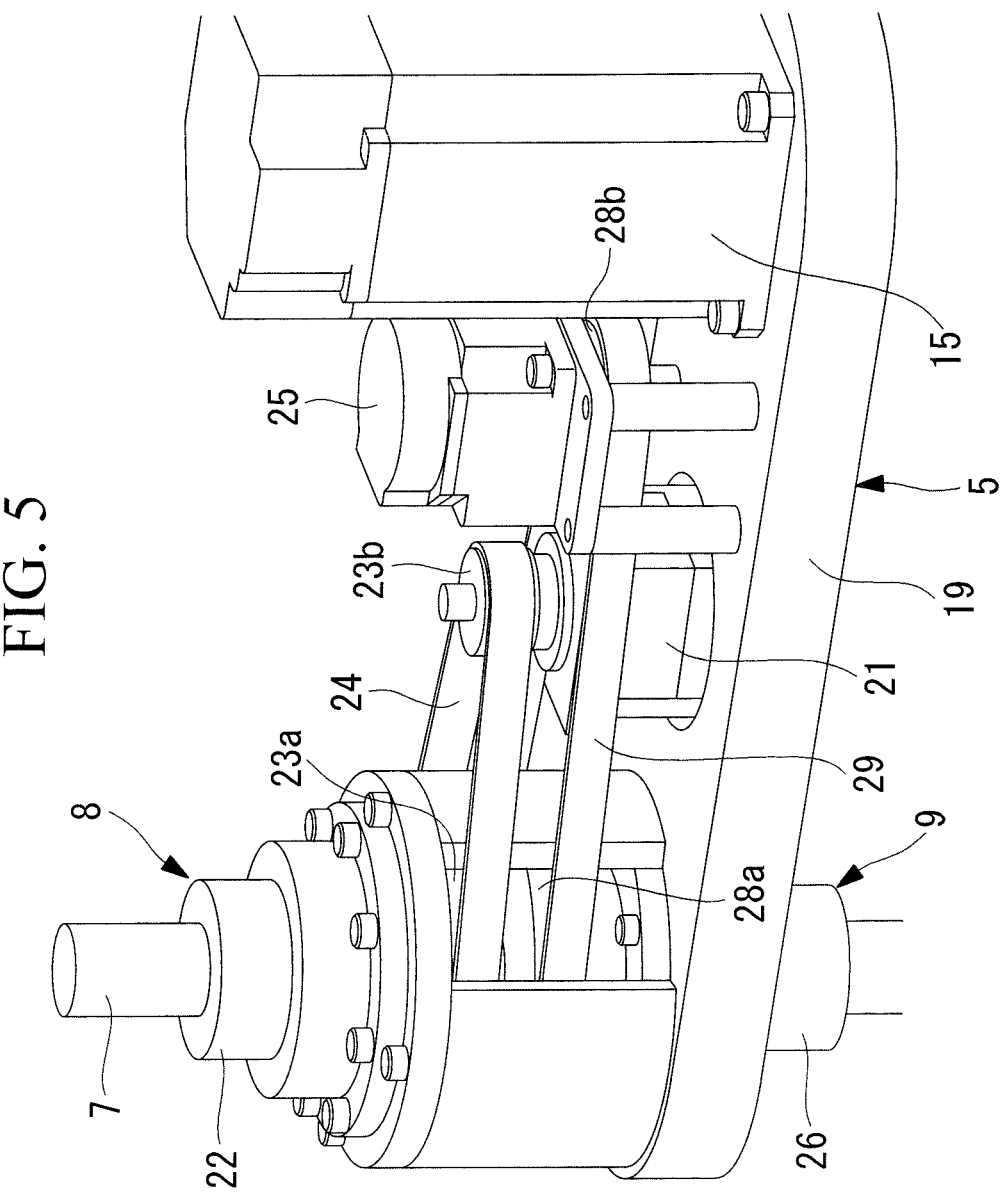
FIG. 5 is a perspective view illustrating a vertical driving part and a rotation driving part of the horizontal articulated robot illustrated in FIG. 4.

Specifically, the present invention also provides a reverse installation method in a case where, as illustrated in FIGS. 4 and 5, the horizontal articulated robot 1 of the floor standing type (or the ceiling suspended type) in which the driving ball spline nut 26 is disposed only below the ball screw nut 22 is changed to the ceiling suspended type (or the floor standing type).

Specifically, the reverse installation method for the horizontal articulated robot 1 according to the present embodiment is a method applied when the horizontal articulated robot 1 that is designed exclusively for the floor standing type is reversed to the ceiling suspended type as illustrated in FIG. 4. This reverse installation method is a method for the horizontal articulated robot 1 exclusively used for the floor standing type in which an auxiliary ball spline nut 27 through which the ball screw spline shaft 7 passes is fixed to the base part 19 of the second arm 5 at the opposite side of the driving ball spline nut 26 with respect to the ball screw nut 22.

In the present embodiment, as illustrated in FIGS. 1 to 3, the auxiliary ball spline nut 27 is fixed to the base part 19 through a tubular adapter 30. The adapter 30 may be formed integrally with the base part 19, or may be formed separately from the base part 19.

The auxiliary ball spline nut 27 is not supplied with a driving force, and is rotated according to the rotation of the ball screw spline shaft 7 about the third axis C.

With this structure, even when the horizontal articulated robot 1 of the floor standing type is reversed and the bottom surface of the base 2 is fixed to a ceiling, as illustrated in FIG. 3, the bending moment acting on the ball screw spline shaft 7 due to the inertia of the workpiece W that is attached to the lower end of the ball screw spline shaft 7 is received by the auxiliary ball spline nut 27 that is disposed close to the workpiece W.

Thus, also when the horizontal articulated robot 1 used as the floor standing type is changed to the ceiling suspended type, an advantage that the horizontal articulated robot 1 can be used without changing the axis configuration can be obtained. With this structure, when the horizontal articulated robot 1 is used as the floor standing type, there is no need to use the auxiliary ball spline nut 27, and it is sufficient to fix the auxiliary ball spline nut 27 only when the horizontal articulated robot 1 is used as the ceiling suspended type.

Accordingly, when the horizontal articulated robot 1 is used as the floor standing type, there is no need to attach the auxiliary ball spline nut 27, which leads to a reduction in the weight and overall height of the second arm 5. When the horizontal articulated robot 1 is used as the ceiling suspended type, it is sufficient to fix the auxiliary ball spline nut 27, and thus there is no need to change the components, such as the base part 19 of the second arm 5, which is advantageous in that the horizontal articulated robot can be changed from the floor standing type at a low cost.

In the present embodiment, the auxiliary ball spline nut 27 is attached when the horizontal articulated robot is changed from the floor standing type to the ceiling suspended type, but instead the auxiliary ball spline nut 27 may be attached when the horizontal articulated robot is changed from ceiling suspended type to the floor standing type.

A driving force is not transmitted to the auxiliary ball spline nut 27, but instead a driving force may be transmitted to the auxiliary ball spline nut 27.

From the above-described embodiments and modifications thereof, the following aspects of the invention are derived.

An aspect of the present invention provides a horizontal articulated robot including: a base; one or more arms attached to the base so as to be capable of rotating horizontally; a ball screw spline shaft that is disposed so as to be capable of rotating about a longitudinal axis extending in a vertical direction at an end of the one or more arms and capable of linearly moving along the longitudinal axis and that supports a workpiece at one end of the ball screw spline shaft; a ball screw nut through which the ball screw spline shaft passes, the ball screw nut being driven in a direction along the longitudinal axis with respect to the one or more arms; and two ball spline nuts configured to support the ball screw spline shaft so as to be capable of rotating about the longitudinal axis, the ball screw spline shaft passing through the ball spline nuts, respectively, on both sides of the ball screw nut interposed therebetween in a longitudinal axis direction. The ball screw spline shaft passing through at least one of the ball spline nuts is driven about the longitudinal axis with respect to the one or more arms.

According to the aspect, the workpiece is supported at the lower end of the ball screw spline shaft and the one or more arms are rotated horizontally with respect to the base, thereby allowing the workpiece to be moved in the horizontal direction. The ball screw nut is rotated about the longitudinal axis to cause the ball screw spline shaft to move vertically along the longitudinal axis extending in the vertical direction, thereby allowing the workpiece supported by the support part to ascend or descend. At least one ball spline nut is rotated to cause the ball screw spline shaft to rotate about the longitudinal axis, thereby allowing the workpiece supported by the support part to rotate horizontally on the spot.

In this case, when the horizontal articulated robot is used as the so-called floor standing type in which the bottom surface of the base is installed on a floor surface, one of the ball spline nuts disposed below the ball screw nut is disposed close to the workpiece supported at the lower end of the ball screw spline shaft, and when the one or more arms are rotated horizontally, the bending moment acting on the ball screw spline shaft due to the inertia of the workpiece is received by one of the ball spline nuts.

On the other hand, when the horizontal articulated robot is used as the so-called ceiling suspended type in which the bottom surface of the base is installed on a ceiling, the positional relationship between the ball screw nut and the ball spline nut is reversed from that of the floor standing type, and the workpiece is supported at a different end of the ball screw spline shaft from that of the floor standing type. In this case, according to the aspect, since the ball spline nuts are disposed on both sides of the ball screw nut interposed therebetween, even if the horizontal articulated robot is used as the ceiling suspended type without changing the axis configuration, the other ball spline nut can be disposed closer to the workpiece than the ball screw nut is. As a result, when the one or more arms are rotated horizontally, the bending moment acting on the ball screw spline shaft due to the inertia of the workpiece is received by the other ball spline nut.

Thus, according to the aspect, the ceiling suspended type or the floor standing type can be freely selected without changing the axis configuration. In both types, the bending moment can be prevented from acting on the ball screw nut. Specifically, a modification for changing the horizontal articulated robot from the floor standing type to the ceiling suspended type is not required, and a free layout design and layout change can be made at a low cost.

In the aspect, one of the ball spline nuts may be detachably attached to the one or more arms.

With this structure, one of the ball spline nut that is not required when the horizontal articulated robot is used as the floor standing type or the ceiling suspended type is dismounted, thereby achieving a reduction in weight and dimensions of the robot by an amount equivalent to the removed the ball spline nut.

A further aspect of the present invention provides a reverse installation method of a horizontal articulated robot including: a base; one or more arms attached to the base so as to be capable of rotating horizontally; a ball screw spline shaft that is disposed so as to be capable of rotating about a longitudinal axis extending in a vertical direction at an end of the one or more arms and capable of linearly moving along the longitudinal axis and that includes a support part supporting a workpiece at one end of the ball screw spline shaft; a ball screw nut through which the ball screw spline shaft passes, the ball screw nut being driven in a direction along the longitudinal axis with respect to the one or more arms; a driving ball spline nut configured to drive the ball screw spline shaft about the longitudinal axis with respect to the one or more arms, the ball screw spline shaft passing through the driving ball spline nut at a side of the horizontal articulated robot closer to the support part than the ball screw nut is. At a side of the horizontal articulated robot opposite to the driving ball spline nut with respect to the ball screw nut, the ball screw spline shaft is passing through an auxiliary ball spline nut and the auxiliary ball spline nut is fixed to the one or more arms.

In a state before the horizontal articulated robot is reversed, the workpiece is supported at the lower end of the ball screw spline shaft and the one or more arms are rotated horizontally with respect to the base, thereby allowing the workpiece to move in the horizontal direction. The ball screw nut is rotated about the longitudinal axis to cause the ball screw spline shaft to vertically move along the longitudinal axis extending in the vertical direction, thereby allowing the workpiece supported by the support part to ascend or descend. Further, the driving ball spline nut is rotated to cause the ball screw spline shaft to rotate about the longitudinal axis, thereby allowing the workpiece supported by the support part to rotate horizontally on the spot.

In this case, the driving ball spline nut disposed below the ball screw nut is disposed close to the workpiece supported at the lower end of the ball screw spline shaft, and when the one or more arms are rotated horizontally, the bending moment acting on the ball screw spline shaft due to the inertia of the workpiece is received by the driving ball spline nut. Thus, the bending moment can be prevented from acting on the ball screw nut.

According to the aspect, at a side of the horizontal articulated robot opposite to the driving ball spline nut with the ball screw nut interposed therebetween before being reversed, the auxiliary ball spline nut is fixed to the one or more arms and the workpiece is attached to the lower end of the ball screw spline shaft of the horizontal articulated robot after being reversely installed, thereby allowing the auxiliary ball spline nut to be disposed at a position closer to the workpiece than the ball screw nut is.

Thus, only by fixing the auxiliary ball spline nut, the bending moment can be prevented from acting on the ball screw nut also in the horizontal articulated robot reversely installed. In other words, when the horizontal articulated robot is reversely installed, there is no need to change arms or replace components, and a layout change and the like can be made at a low cost.

REFERENCE SIGNS LIST 1 horizontal articulated robot
2 base
3 first arm (arm)
5 second arm (arm)
7 ball screw spline shaft
22 ball screw nut
26 driving ball spline nut (ball spline nut)
27 auxiliary ball spline nut (ball spline nut)
W workpiece

The invention claimed is:

1. A horizontal articulated robot comprising:
a base;
one or more arms attached to the base so as to be capable of rotating horizontally;
a ball screw spline shaft that is disposed so as to be capable of rotating about a longitudinal axis extending in a vertical direction at an end of the one or more arms and capable of linearly moving along the longitudinal axis that supports a workpiece at one end of the ball screw spline shaft;
a ball screw nut through which the ball screw spline shaft passes, the ball screw nut being driven in a direction along the longitudinal axis with respect to the one or more arms; and
two ball spline nuts configured to support the ball screw spline shaft so as to be capable of rotating about the longitudinal axis, the ball screw spline shaft passing through the ball spline nuts, respectively, on both sides of the ball screw nut interposed therebetween in a longitudinal axis direction,
wherein the ball screw spline shaft passing through at least one of the ball spline nuts is driven about the longitudinal axis with respect to the one or more arms,
wherein at least one pulley is fixed to the ball screw nut and a main ball spline nut of the two ball spline nuts so that the ball screw spline shaft is moved about the longitudinal axis via the ball screw nut and the main ball spline nut,
wherein the at least one pulley includes a first pulley and a second pulley, the first pulley is fixed to the ball screw nut, the second pulley is fixed to the main ball spline nut, and the first pulley and the second pulley are located between the ball screw nut and the main ball spline nut.

2. The horizontal articulated robot according to claim 1, wherein one of the two ball spline nuts is detachably attached to the one or more arms.

3. A method of installation of a horizontal articulated robot for a reverse orientation, the horizontal articulated robot comprising a base; one or more arms attached to the base so as to be capable of rotating horizontally; a ball screw spline shaft that is disposed so as to be capable of rotating about a longitudinal axis extending in a vertical direction at an end of the one or more arms and capable of linearly moving along the longitudinal axis and that includes a support part supporting a workpiece at one end of the ball screw spline shaft; a ball screw nut through which the ball screw spline shaft passes, the ball screw nut being driven in a direction along the longitudinal axis with respect to the one or more arms; and a driving ball spline nut configured to drive the ball screw spline shaft about the longitudinal axis with respect to the one or more arms, the ball screw spline shaft passing through the driving ball spline nut, the method comprising:

preparing an auxiliary ball spline nut that is configured to be rotated according to a rotation of the ball screw spline shaft about the longitudinal axis;

passing the ball screw spline shaft through the auxiliary ball spline nut at a side of the horizontal articulated robot opposite to the driving ball spline nut with respect to the ball screw nut, and fixing the auxiliary ball spline nut to the one or more arms, wherein at least one pulley is fixed to the ball screw nut and a main ball spline nut of the two ball spline nuts so that the ball screw spline shaft is moved about the longitudinal axis via the ball screw nut and the main ball spline nut, wherein the at least one pulley includes a first pulley and a second pulley, the first pulley is fixed to the ball screw nut, the second pulley is fixed to the main ball spline nut, and the first pulley and the second pulley are located between the ball screw nut and the main ball spline nut.

\* \* \* \* \*